United States Patent
Palliyil et al.

(10) Patent No.: US 7,519,726 B2
(45) Date of Patent: Apr. 14, 2009

(54) METHODS, APPARATUS AND COMPUTER PROGRAMS FOR ENHANCED ACCESS TO RESOURCES WITHIN A NETWORK

(75) Inventors: Sudarshan Palliyil, Bangalore (IN); Shivakumara Venkateshamurthy, Bangalore (IN); Srinivas Belur Vijayaraghavan, Bangalore (IN); Tejasvi Aswathanarayana, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 10/735,433

(22) Filed: Dec. 12, 2003

(65) Prior Publication Data
US 2005/0131900 A1    Jun. 16, 2005

(51) Int. Cl.
*G06F 17/30* (2006.01)

(52) U.S. Cl. ............... 709/232; 709/231; 709/230; 709/233; 709/219; 707/10

(58) Field of Classification Search ............ 711/118; 709/232, 230, 231, 233, 219; 707/10
See application file for complete search history.

(56) References Cited

U.S. PATENT DOCUMENTS

| | | | |
|---|---|---|---|
| 5,502,815 A | 3/1996 | Cozza | |
| 6,098,079 A * | 8/2000 | Howard | 707/205 |
| 6,195,695 B1 | 2/2001 | Cheston et al. | |
| 6,212,521 B1 * | 4/2001 | Minami et al. | 707/10 |
| 6,275,937 B1 | 8/2001 | Hailpern et al. | |
| 6,295,610 B1 * | 9/2001 | Ganesh et al. | 714/19 |
| 6,298,445 B1 | 10/2001 | Shostack et al. | |
| 6,434,533 B1 * | 8/2002 | Fitzgerald | 705/10 |
| 6,434,553 B1 * | 8/2002 | Sekiguchi et al. | 707/4 |

(Continued)

OTHER PUBLICATIONS

Article entitled "Performance Analysis of a Dynamic Parallel Downloading Scheme from Mirror Sites Throughout the Internet" by Miu et al., dated Mar. 21, 2000.*

(Continued)

*Primary Examiner*—Tim T Vo
*Assistant Examiner*—Mahesh H Dwivedi
(74) *Attorney, Agent, or Firm*—Anthony V. S. England; T. Rao Coca; William Steinberg

(57) ABSTRACT

Provided are methods, apparatus and computer programs for enhanced access to resources within a network, including for controlling use of bandwidth-sensitive connections within a network and/or for automated recovery. Hash values are used as 'unique' identifiers for resources distributed across a network, and each one of a set of pool servers store the hash values for a set of computers within a LAN. When a resource is required, a hash value representing the resource can be retrieved and compared with hash values stored at a pool server to determine whether the pool server holds a matching hash value. Any such matching hash value found on the pool server represents an identification of a local copy of the required resource, because of the uniqueness property of secure ash values. The information within the pool server can be used to access the required resource. If a large resource such as a BLOB or new version of a computer program can be obtained from another computer within a LAN, a reduction in reliance on bandwidth-sensitive Internet connections and reduced load on remote servers becomes possible.

4 Claims, 7 Drawing Sheets

U.S. PATENT DOCUMENTS

| | | | |
|---|---|---|---|
| 6,438,606 B1* | 8/2002 | Ward | 709/238 |
| 6,460,055 B1 | 10/2002 | Midgley et al. | |
| 6,480,097 B1 | 11/2002 | Zinsky et al. | |
| 6,526,418 B1 | 2/2003 | Midgley et al. | |
| 6,577,920 B1 | 6/2003 | Hypponen et al. | |
| 6,647,421 B1* | 11/2003 | Logue et al. | 709/226 |
| 6,742,023 B1* | 5/2004 | Fanning et al. | 709/219 |
| 6,754,657 B2* | 6/2004 | Lomet | 707/8 |
| 6,883,135 B1* | 4/2005 | Obata et al. | 715/500 |
| 2001/0042171 A1* | 11/2001 | Vermeulen | 711/118 |
| 2002/0038296 A1* | 3/2002 | Margolus et al. | 707/1 |
| 2004/0068652 A1* | 4/2004 | Carpentier et al. | 713/168 |
| 2004/0172476 A1* | 9/2004 | Chapweske | 709/231 |
| 2005/0090283 A1* | 4/2005 | Rodriquez | 455/552.1 |
| 2005/0138081 A1* | 6/2005 | Alshab et al. | 707/200 |

OTHER PUBLICATIONS

Internet Engineering Task Force (IETF) Network Working Group's Request for Comments 1321, "The MD5 Message-Digest Algorithm", R. Rivest, Apr. 1992 (downloaded from Website 'www.ietf.org' on Jul. 4, 2003).

IETF Network Working Group's RFC 3174, "US Secure Hash Algorithm 1 (SHA1)", D. Eastlake 3rd and P. Jones, Sep. 2001 (downloaded from Website 'www.ietf.org' on Jul. 4, 2003).

W. Charlie Hu, Saumitra M. Das and Himabindu Pucha, "Exploiting the Synergy between Peer-to-Peer and Mobile Ad Hoc Networks" (downloaded from Website 'www.usenix.org' on Oct. 21, 2003).

D. Youd, "What is Digital Signature? An introduction to Digital Signatures" (downloaded from Website 'www.youdzone.com' on Oct. 21, 2003).

W. Roush, "the internet reborn", Technoloy Review, Oct. 2003, pp. 28-37.

M. Bishop, "An Overview of Computer Viruses in a Research Environment", Technical Report, Department of Math and Computer Science, Dartmouth College, Hanover-NH 03755, 1992.

S. Kumar and E.H. Spafford, A generic virus scanner in $C^{++n}$, in Proceedings of the $8^{th}$ Computer Society Applications Conference, pp. 210-219, Los Alamitos CA, Dec. 1992, ACM, IEEE Computer Society.

B. Le Charlier, A. Mounji, M. Swimmer, "Dynamic detection and classification of computer viruses using general behaviour patterns", 1995 (downloaded from Website citeseer.nj.nec.com on Nov. 19, 2003).

J.E.Berkes, "Decentralized Peer-to-Peer Network Architecture:Gnutella and Freenet", University of Manitoba, Winnipeg, Manitoba, Canada, 2003. (downloaded as file 'home.cc.umanitoba.ca/~umberkes/filesharing.pdf' from Web page 'home.cc.umanitoba.ca/~umberkes/academic.html' on Dec. 10, 2003).

S. Palliyil et al., "Apparatus, Methods and Computer Programs for Controlling Performance of Operations within a Data Processing System or Network", filed Dec. 12, 2003.

S. Palliyil et al., "Apparatus, Methods and computer Programs for Identifying Matching Resources within a Data Processing Network", filed Dec. 12, 2003.

S. Palliyil et al., "Apparatus, Methods and Computer Programs for Identifying or Managing Vulnerabilities within a Data Processing Network", filed Dec. 12, 2003.

* cited by examiner

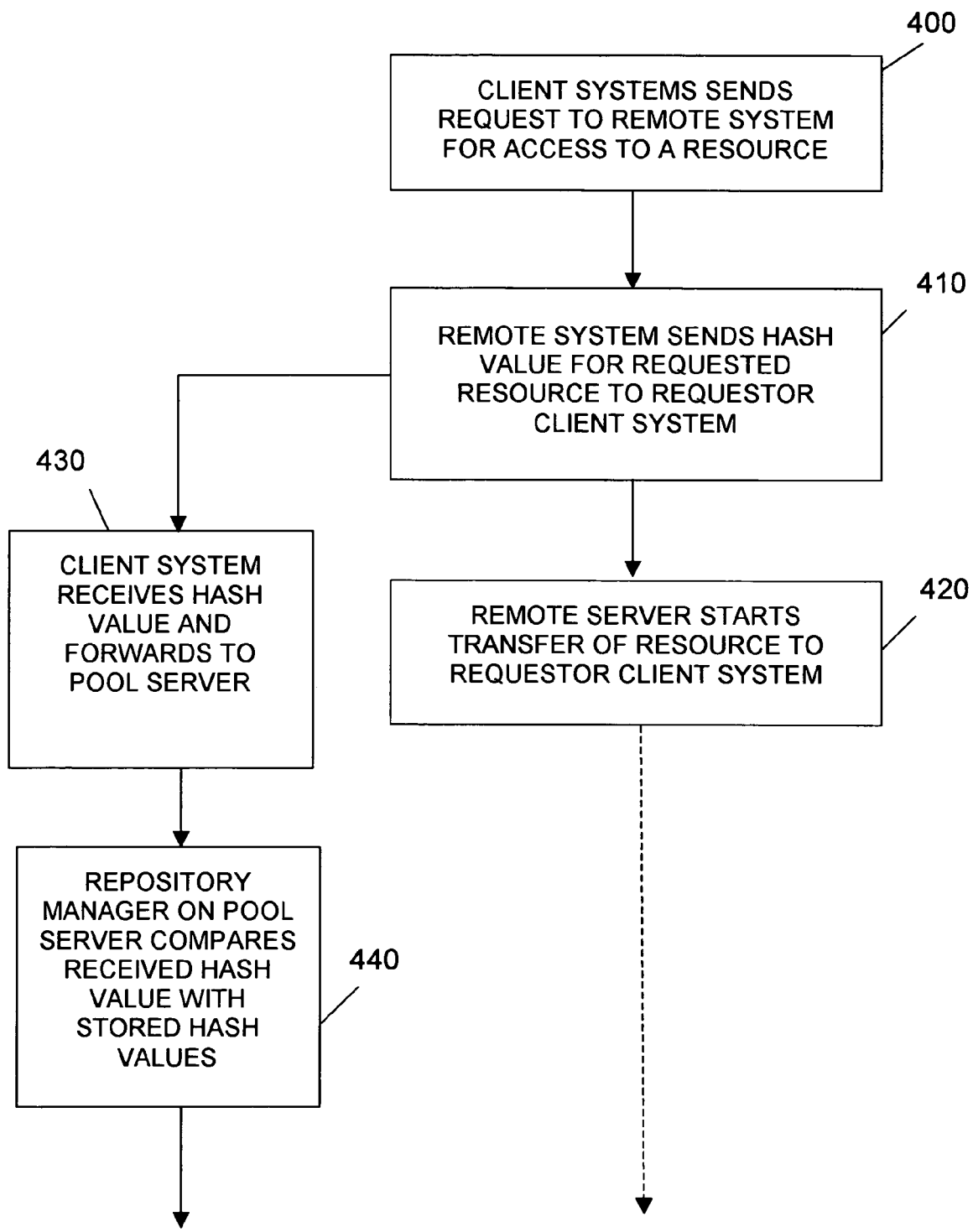

METHODS, APPARATUS AND COMPUTER PROGRAMS FOR ENHANCED ACCESS TO RESOURCES WITHIN A NETWORK

FIELD OF INVENTION

The present invention relates to methods, apparatus and computer programs for enhanced access to resources within a network, including for controlling use of bandwidth-sensitive connections within a network and/or for automated recovery.

BACKGROUND

With increased economic globalisation and the desire to increase productivity, coupled with improved network communications and the impact of the Internet in particular, the world has become increasingly dependent on the ability to retrieve data that is required at a data processing apparatus from elsewhere in a global network. The required data may include data files such as sound or video, executable files, BLOBs (binary large objects) from databases, e-mail attachments, etc. For example, e-mail communications and access to Web pages are essential for daily business in a vast range of industries, and software patches and upgrades are made available for download via the Internet to avoid the cost and delays of distributing diskettes or CD-ROMs.

However, with increased use of home computers, mobile communications and mobile data processing devices, much of this network traffic is exchanged across relatively low bandwidth communications channels. Additionally, many organisations connect their local area networks to the Internet via proxy servers for reasons of cost, security and management efficiency. When the proxy server is heavily used, the capacity of the proxy server or its communication channels may limit communication throughput even if a relatively high bandwidth channel is available. Furthermore, a high bandwidth connection between a local computer and its neighbours within a network does not imply that all of the required links between the start and end points of a network communication can match that bandwidth—bottlenecks and consequent delays can arise anywhere in the network.

With more and more applications being made available for access from anywhere in the world, Internet communication traffic has become excessive. Typical application response times can increase as a result, from milliseconds or seconds to seconds or minutes. This reduces the productivity of computer users and reduces the useability of the applications. The 'applications' in this context may include, for example, services provided by Web servers, application servers, mail servers, 'groupware' applications, 'instant' messengers that allow files to be exchanged, automated software installers or databases.

A great deal of the data flowing across congested Internet connections is repetitious. It is common for several people within the same department of an organisation to download the same data via the same proxy server. Furthermore, individual users often download a second copy of data that they retrieved previously—such as when a small part of the data has changed or when a program installation process was only partially successful. In some cases, a user repeats retrieval of data because the user cannot recall where data was saved. Although automated caching of data is known, the data held in a cache is typically only available to the specific application that cached the data. Furthermore, although a Web browser may have cached material from a Web site, if a different URL is used to access the same material the Web browser will fetch a new copy of the material.

SUMMARY

Aspects of the present invention provide methods, computer systems and computer programs for controlling inefficient and redundant data transfers within a data processing network.

A first embodiment of the invention provides a method for accessing resources within a data processing network. The method comprises the steps of computing a set of hash values representing a set of resources stored in association with at least one data processing system within the network, and storing the computed set of hash values. This data processing system (or systems) is accessible via a non-bandwidth-sensitive connection. In response to a requirement for access to a first resource, which is accessible via a bandwidth-sensitive connection, a hash value derived from the required first resource is retrieved and compared with the stored set of hash values. This identifies any match between the retrieved hash value and any of the stored set of hash values. This determines whether the resource is available at the data processing system (or one of the systems) for which hash values are stored. If the resource is determined to be available, the method initiates retrieval of the required first resource from the relevant data processing system via a non-bandwidth-sensitive connection. If no matching hash value is identified, the required first resource is retrieved via the bandwidth-sensitive connection.

A 'bandwidth-sensitive' connection in this context may be a low bandwidth Internet connection, a wireless connection to a network, any connection to data processing systems outside a LAN, or any other connection for which there is a desire to control bandwidth usage or to mitigate bandwidth-related constraints on resource access speed. A 'non-bandwidth-sensitive' connection may be any connection for which bandwidth is higher or load levels are lower relative to bandwidth-sensitive connections, or any connection for which there is a reduced need to control bandwidth usage relative to bandwidth-sensitive connections.

The 'at least one data processing system' may be the specific data processing system at which the resource is required, or a plurality of data processing systems within a LAN including the system at which the resource is required, or any system which is accessible via a non-bandwidth-sensitive connection. The ability to access resources without relying on a bandwidth-sensitive connection may enable a reduction of overall network congestion and consequent general communication delays, or a reduction of the time or cost of the current resource access.

The required resource may be, for example, a Web page, an executable program, a data file such as an image, video or audio file, or a BLOB from a database, or any resource that can be represented by binary data. Many of these resource types can include a large volume of data. For example, a computer program service pack may be 100 MB in size or more. Accessing such resources across network connections requires considerable bandwidth, and even relatively high bandwidth connections can become congested when multiple users attempt to access large resources from remote computers at the same time.

The first embodiment of the invention may be used to determine whether the required resource can be accessed on the requestor's own data processing system or from another data processing system within the requestor's local area network, avoiding reliance on limited-bandwidth Internet connections when possible.

In one embodiment, attempts to access a resource may be made in parallel via the bandwidth-sensitive connection and via non-bandwidth-sensitive connections (such as to other data processing systems within a LAN). A request to another data processing system within the LAN may be sent in response to receipt via the bandwidth-sensitive connection of a hash value derived from, and uniquely representing, the required resource. The first-retrieved copy of the resource may then be accepted, and this is likely to be the copy accessible from a system within the LAN; and any parallel attempts to access the resource can be terminated when a full copy of the resource has been retrieved from one of the sources.

Alternatively, the resource may be built from portions of the resource retrieved in parallel from different sources. This may further improve retrieval speed. According to this embodiment, the bit sequence of a copy of a required resource within a LAN is transmitted to the requestor system in reverse order relative to a copy being transmitted from a remote system. That is, the first portion is obtained from the remote system, and file size information together with the last portion is retrieved from within the LAN. When the total number of bits retrieved reaches the known file size of the required resource, the two portions can be combined to build a full copy of the resource.

A second embodiment of the invention provides a method for accessing resources within a data processing network. The method includes a step of computing a set of hash values representing a set of resources distributed across a plurality of data processing systems within a local area network (LAN). The resources within the set of resources are accessible from respective ones of the plurality of data processing systems. The set of computed hash values are stored together with an identification of a respective data processing system (one of the plurality of data processing systems) storing the resource corresponding to each of the set of hash values. Subsequently, in response to a requirement for access to a resource that is stored at a remote data processing system, a hash value derived from the required resource is retrieved from the remote data processing system. The retrieved hash value is compared with the stored set of hash values to identify a match between the retrieved hash value and any of the stored set of hash values. In response to identifying a match for the retrieved hash value, the method initiates retrieval of the required resource from a respective one of the plurality of data processing systems at which the resource corresponding to the matched hash value is stored. If no match is identified for the retrieved hash value, the required resource is retrieved from the remote data processing system.

Such an embodiment may reduce load on the remote data processing system. The remote data processing system may be accessible via a relatively low bandwidth Internet connection, whereas the plurality of data processing systems for which hash values are stored may be connected via relatively high bandwidth connections in the LAN. Such an embodiment of the invention enables access to resources within the LAN when available, enabling more efficient use of the bandwidth available for Internet connections and potentially providing faster access to required resources.

The above-described embodiment may be implemented within a wide area network (WAN), with each of a number of pool servers holding hash values for the set of resources stored within data processing systems in a respective LAN. The pool servers also hold the identifications of which system within their LAN holds respective resources, and preferably also an identification of which directory within each system holds a respective resource or an identification of a file name and path to the resource.

A further embodiment of the invention provides a method for accessing resources within a data processing network. The method includes computing a set of hash values representing a set of resources distributed across a plurality of data processing systems within the network. The set of hash values is stored together with an identification of a respective data processing system at which the resource corresponding to each of the set of hash values is stored. The resources within the set of resources are accessible from respective ones of the plurality of data processing systems. In response to a requirement for access to a resource, which is accessible via a bandwidth-sensitive connection, a hash value derived from the required resource is retrieved and compared with the stored set of hash values. The comparison identifies any match between the retrieved hash value and any of the stored set of hash values. In response to identifying a match for the retrieved hash value, the required resource is retrieved from a respective one of the plurality of data processing systems at which the resource corresponding to the matched hash value is stored. If no match is identified for the retrieved hash value, the required resource is retrieved via the bandwidth-sensitive connection.

A further embodiment of the invention provides a method for accessing resources within a data processing network, which includes the step of embedding a hash-based reference to a resource within a hyperlink. The hyperlink includes an identification of a server computer and a hash value representing the bit pattern of a resource. A user interaction with a hyperlink according to this embodiment of the invention causes a resource-access requestor program such as a Web Browser running on the user's computer to send a request for resource access to a server computer identified within the hyperlink. However, instead of a conventional file identifier such as would be sent to a Web server or FTP server in response to interaction with a conventional HTTP or FTP hyperlink, the hyperlink includes a hash value which serves as a unique identifier for the requested resource. A pool server computer stores hash values derived from and representing each of a set of resources available via the pool server. On receipt of a resource request that specifies the hash value of the required resource, the hash value of the request is compared with hash values stored in a repository at the pool server to identify a match. The repository either holds a copy of the resource associated with each stored hash value, or an identifier of the location of a system within the network (and preferably a directory within the system) at which the resource is stored.

A further embodiment of the invention provides a method for restoring computer system resources following a failure. For each of a set of data processing systems, the method includes computing a set of hash values representing a set of resources stored within the respective data processing system. The set of hash values for each of the set of data processing systems is stored in at least one repository. In response to a failure affecting resources stored at a data processing system within the set of data processing systems, the method includes comparing the set of hash values stored in the repository for the affected data processing system with the stored hash values for other data processing systems within the set of data processing systems. The comparison identifies any resources stored within the other data processing systems having hash values matching resources of the affected data processing system. Identified resources having hash values matching resources of the affected data processing system are then copied from the other data processing systems to restore resources of the affected data processing system.

The embodiment of the invention described above can support recovery of system resources from locally connected systems holding duplicates of the resources.

A further embodiment of the invention provides a data processing system comprising a processing unit, a data storage unit for storing a set of hash values representing a set of resources available from a first set of data processing systems, and a repository manager. The repository manager implements functions for comparing a received hash value with the stored set of hash values to identify a match between a received hash value and any of the stored hash values. The repository manager is responsive to identification of a match between a stored hash value and a received hash value representing a required resource, to output a confirmation that the required resource is available from a data processing system of the first set of data processing systems.

A data retrieval controller responds to a requirement for access to a resource that is accessible via a bandwidth-sensitive connection, by retrieving a hash value derived from the required resource and sending the retrieved hash value to the repository manager. The repository manager compares the received hash value with the stored set of hash values to identify a match between the received hash value and any of the stored set of hash values. The repository manager and the data retrieval controller communicate with each other to respond to identification of a match between the received hash value and a stored hash value by initiating retrieval of the required resource from the first set of data processing systems. If no match is identified for the received hash value, the data retrieval controller (or repository manager) initiates retrieval of the required resource via the bandwidth-sensitive connection.

The data processing system may be a pool server computer and the data retrieval controller may be a computer program running on each data processing system within a LAN. The repository manager runs on the pool server and stores and compares secure hash values representing resources distributed across a set of computers within the LAN.

A data processing apparatus according to a further embodiment of the invention may be a client data processing apparatus including a client data retrieval manager. The data retrieval manager is configured to respond to receipt of a hash value representing a desired resource, by forwarding the hash value to a repository manager of a pool server for comparison with stored hash values.

A third data processing apparatus according to one embodiment of the invention stores a set of resources together with hash values derived from the resources, and is configured to respond to a request for access to a resource by forwarding to the requestor a secure hash value representing the resource. The third data processing apparatus may be a remote server computer remote from the first and second apparatus. The third data processing apparatus may commence transfer of a copy of the required resource as part of the same communication flow as the transfer of the hash value, or the third data processing apparatus may await confirmation that the resource is not available locally before transferring the required resource.

The data processing apparatus described above may be implemented within a distributed network comprising a plurality of pool server computers which each store a set of hash values representing resources available at a respective set of data processing systems within their respective LAN.

Methods according to the above-described embodiments of the invention may be implemented in computer program code. The program code may be made available as program products comprising program code recorded on a recording medium or via any data transfer medium.

BRIEF DESCRIPTION OF DRAWINGS

Preferred embodiments of the invention are described in detail below, by way of example, with reference to the accompanying drawings in which.

DETAILED DESCRIPTION OF EMBODIMENTS

Figure 1:
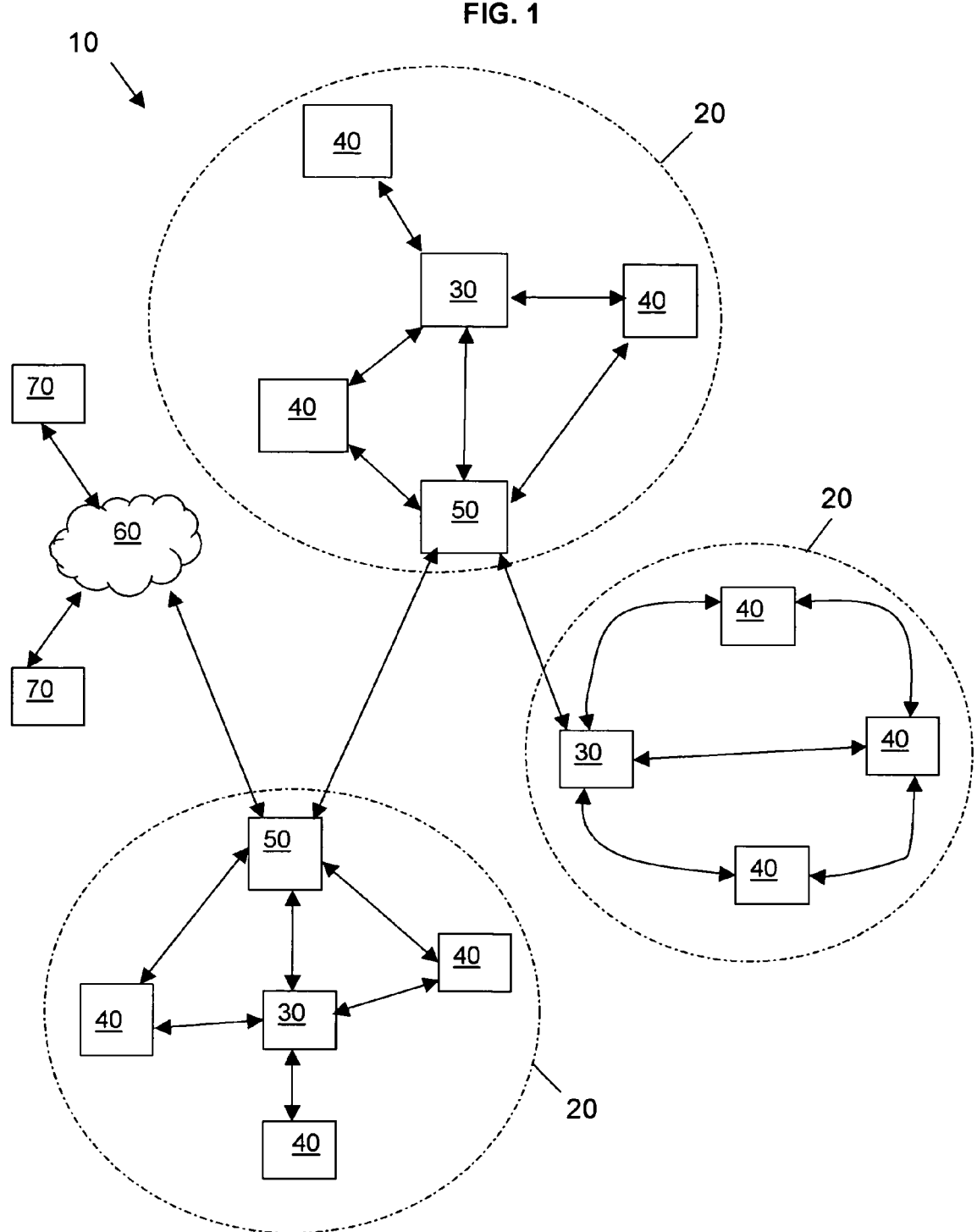
FIG. 1 is a schematic representation of a data processing network comprising a plurality of interconnected local area networks.

A first embodiment of the invention is implemented in a data processing network as shown schematically in FIG. 1. The network 10 includes a plurality of interconnected local area networks (LANs) 20 which each include a pool server data processing system 30 and a number of client data processing systems 40 connected to the pool server 30 within their LAN 20. Some LANs may include an additional proxy server or gateway 50 via which they connect to the wider network 60, or connectivity to the wider network may be provided via the pool server 30. Any of the client systems 40 may send requests via the network for access to resources stored at remote server systems 70.

Embodiments of the invention may be implemented by a set of components distributed across the entire network 10, distributed within an individual LAN 20, or contained within individual data processing systems 30, 40, 70. A number of alternative embodiments of the invention are described below.

It will be apparent to a person skilled in the art that individual steps of the methods described below can be implemented in computer program code and that a variety of programming languages and coding implementations may be used to implement the described methods. Moreover, the computer programs are not intended to be limited to the specific control flow described below, and one or more of the described steps of a program may be performed in parallel rather than sequentially as described, or sequentially if a parallel implementation is described. One or more of the operations described in the context of a computer-program-controlled implementation could alternatively be performed by a hardware electronics component.

Some portions of the following description refer to 'algorithms' for performing operations on data within a computer memory. An algorithm is a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods. Such apparatus may be specially constructed for the required purposes, or may comprise one or a connected plurality of general purpose computers or other devices selectively activated or reconfigured by a computer program stored in the computer or device. The algorithms and methods described below are not inherently related to any particular computer or other apparatus. Various general-purpose machines may be used with programs in accordance with the teachings herein. Alternatively, the construction of more specialised apparatus to perform the required method steps may be appropriate.

The terms 'client' and 'server' data processing systems as used herein are not intended to imply any limitation on the type of data processing systems, but merely indicate the nature of the relationship between different systems for the purpose of describing roles and operations relating to the invention. A 'client' may request data or services from a 'server', and the 'server' performs those services or provides the requested data for the 'client'. However, the client and server roles could be implemented using identical hardware. A system providing services as a 'server' for the purposes of the present invention may be a 'client' for other purposes, and vice versa.

In addition, the present specification also discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general-purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

Hash Grid Architecture

Figure 2:
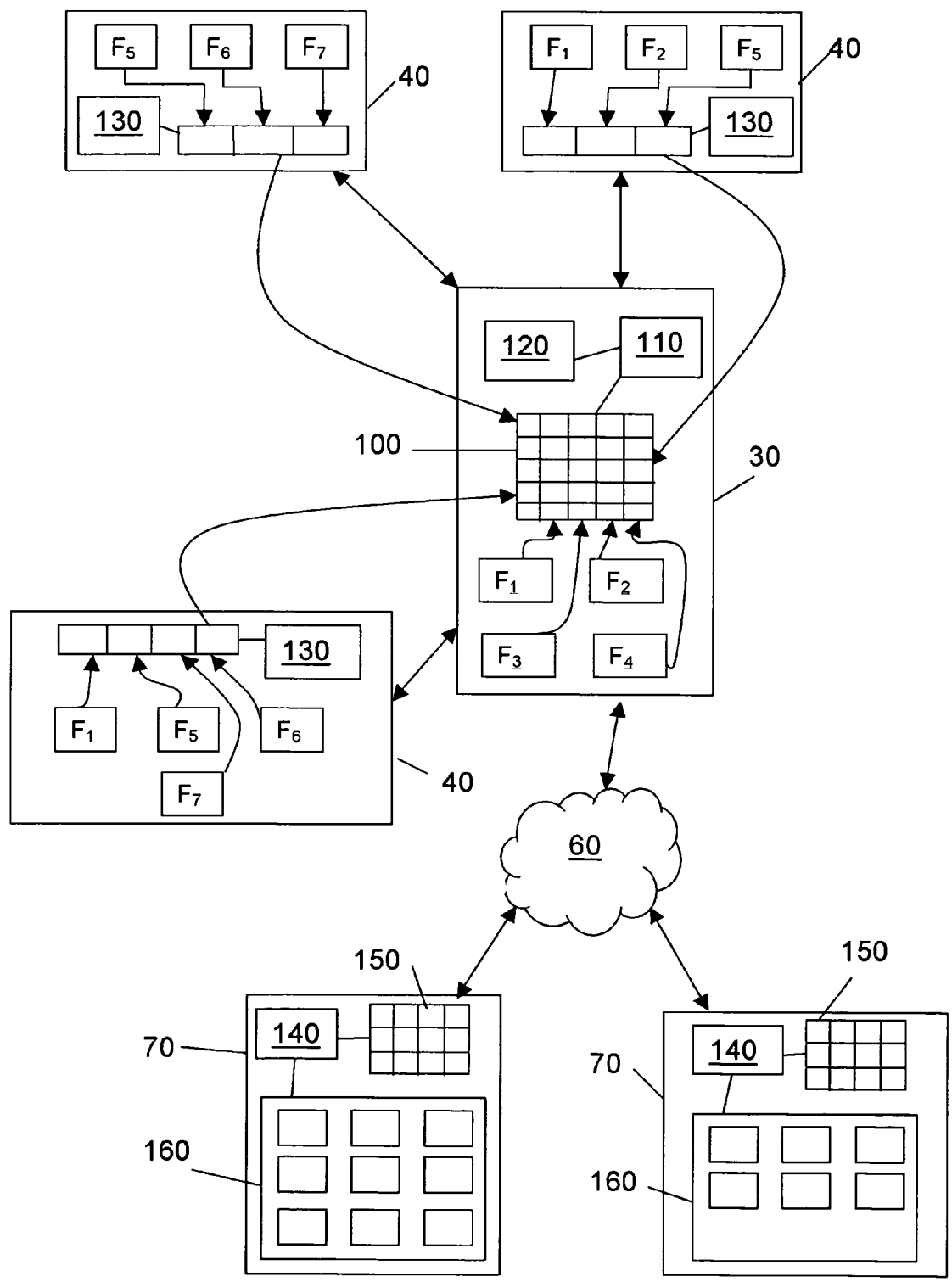
FIG. 2 is a schematic representation of resources distributed across a local area network, according to an embodiment of the invention.

FIG. 2 shows an example local area network (LAN) 20 including a pool server 30 and a number of client data processing systems 40. The LAN is connected within a wider network providing access to resources stored at remote data processing systems 70. In the present example, a single LAN has a single pool server, but in alternative embodiments there may be more than one pool server within a LAN, or more than one interconnected LAN for a single pool server. The pool server 30 includes at least one repository 100 for storing identifiers for the set of resources (data files and executable files of various different types) held at each of the data processing systems 30,40 within the LAN 20. A repository manager 110 updates the repository 100 in response to new information from the client systems 40 regarding their locally stored resources, and provides access to the information held in the repository 100. The pool server 30 may hold copies of the resources, or a subset of the resources, held at other systems in the LAN as well as the repository of resources and system identifiers.

According to a first example implementation of the invention, the repository 100 holds an identifier for each resource within each system of the LAN, together with a copy of the resource for a subset of the resources in the LAN. This subset includes, for example, a set of frequently accessed resources—to enable efficient access from any system connected to the pool server. The subset also includes a set of the resources for which multiple replicas are not available within the LAN—providing a backup copy of 'rare resources' for recovery purposes.

The resource identifiers stored in the repository 100 are secure hash values derived from bit patterns of the resources, together with an identification of the system and directory name or access path to the resource. Secure hash values may be considered 'computationally unique' identifiers for the resource from which they are derived, and they represent the bit pattern of the resource itself. This 'uniqueness' property of secure hash values differentiates them from many other types of identifier that are merely convenient labels. The uniqueness property of secure hash values is defined more accurately as a very low probability of two identical hash values arising from hashing two different files (referred to as 'collision').

The uniqueness property of secure hash values enables a requestor program to specify a requirement for a resource by specifying the hash value, without having to specify a particular file name or path to the desired file.

A number of hashing algorithms are known for use in cryptographic solutions—such as digital signature applications where a large file must be compressed in a secure manner before being encrypted. An example is the MD5 Message-Digest algorithm, as described in the Internet Engineering Task Force Network Working Group's Request for Comments 1321, "The MD5 Message-Digest Algorithm", R. Rivest, April 1992. MD5 produces a 128-bit hash or digest of an input of arbitrary length. MD5 may be considered "secure" in the sense that there is a very low probability of two different messages having the same message digest, and it remains computationally difficult to compute a message having a pre-specified target message digest. However, this does not mean that the MD5 algorithm is totally unbreakable, and a more secure algorithm is preferred for implementing the present invention.

The Secure Hash Algorithm (SHA) is another known hash function, specified in the Secure Hash Standard (SHS, FIPS 180) and revised in 1994 to produce SHA-1. SHA-1 is described in the IETF Network Working Group's RFC 3174, "US Secure Hash Algorithm 1 (SHA1)", D. Eastlake $3^{rd}$ and P. Jones, September 2001. SHA-1 takes a message of less than $2^{64}$ bits in length and produces a 160-bit message digest. SHA-1 is slightly slower but more secure than MD5, and hashes computed using SHA-1 are currently considered 'computationally unique'.

A number of other secure hash functions are also known which have output hashes of 160 to 512 bits, such as RIP- EMD-160 (a 160-bit cryptographic hash function, designed by Hans Dobbertin, Antoon Bosselaers and Bart Preneel) and WHIRLPOOL (a hash function designed by Vincent Rijmen and Paulo Barreto which operates on messages less than $2^{256}$ bits in length, and produces a message digest of 512 bits).

The level of security of a hash is determined by the number of output bits and the hashing algorithm, and relates to the strength of its non-collision property. The specific hash algorithms mentioned above are for illustrative purposes only. The choice of a specific hash function can be made according to the computing power available at implementation or deployment time, and other characteristics of the hardware and software environment, to ensure an optimum balance between security and speed. A suitable hash function H is a hash function which satisfies the non-collision property such that it is computationally infeasible, at the time of deployment, to find a message y not equal to a message x such that $H(x)=H(y)$.

The SHA-1 algorithm, which produces message digests having 160 bits and is (at the time of writing) considered appropriate for many digital signature applications, is an example of an algorithm that is considered appropriate (at the time of writing). In general, hashes of a length considered appropriate for digital signature applications at a particular point in time will be appropriate for implementing the present invention at that point in time.

Each client data processing system 40 within the LAN includes a hash client program 130 for applying a secure hash function to its set of resources to derive a set of hash values representing the resources stored at that system. The pool server 30 includes equivalent program code 120 for performing this hashing function for the resources stored on the pool server 40. The hashing program code 120 on the pool server may be integrated within or interface to the repository manager 110.

As described above with reference to FIG. 1, a wide area network such as an intranet or the Internet may include a large number of interconnected LANs. Each LAN relies on hash values stored on a respective pool server to keep track of the set of resources stored at computers within the LAN. This network or grid of pool servers containing hash values for respective LANs may also comprise network topology information for determining which LAN gateway or pool server to contact (and how to route communications to the determined LAN gateway or pool server) to examine the set of hash values for each data processing system in the wider network.

Figure 3:
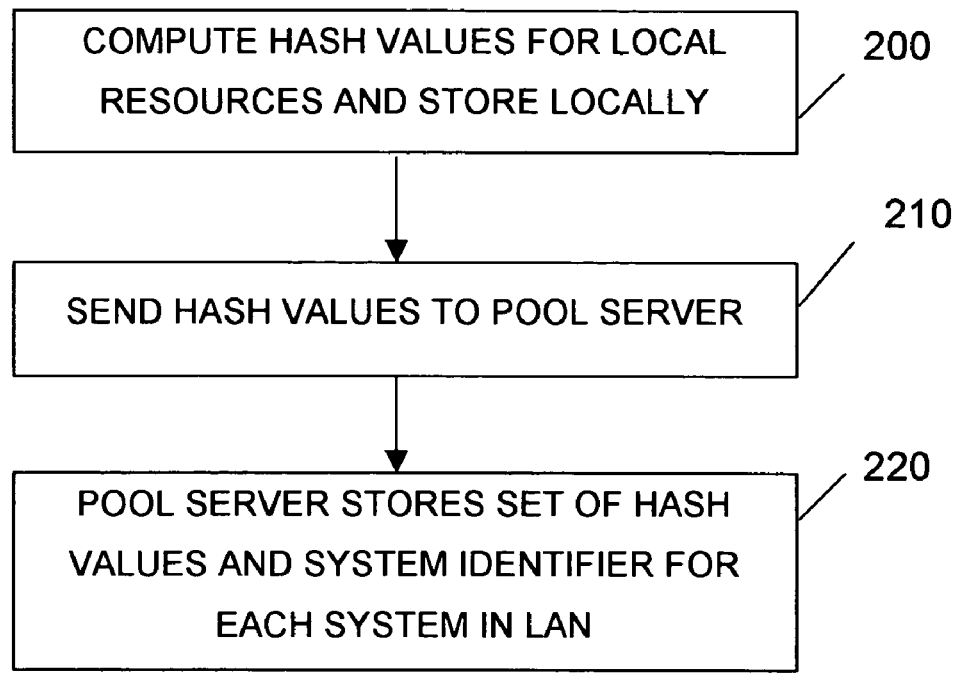
FIG. 3 is a high-level flow diagram showing a sequence of set-up steps, according to an embodiment of the invention.

As showed schematically in FIG. 3, an initial sequence of set-up steps include the hash client 130 or hashing program 120 computing 200 a set of hash values for the resources on its local system. This set of computations is performed periodically or when triggered by user actions. Hash values may be computed for all resources on the system, or for a subset such as all resources above a threshold size. The hash client 130 or hashing program 120 stores its respective set of hash values in association with the locally stored resources. The hash client programs 130 also send 210 a copy of their set of hash values, and a description of the location of each resource corresponding to each hash value, to the repository manager 110. The repository manager 110 stores them 220 as updates to the repository 100. In the present embodiment, a subset of the resources stored at each of the data processing systems in the LAN are also copied to the pool server. Similarly, the repository manager 110 stores 220 hash values computed by the hashing program 120 running on the pool server. The hash values are stored 220 (with an identification of the directory or fully-resolved location and file name) in the repository 100.

Managing Retrieval of Resources

Figure 4:
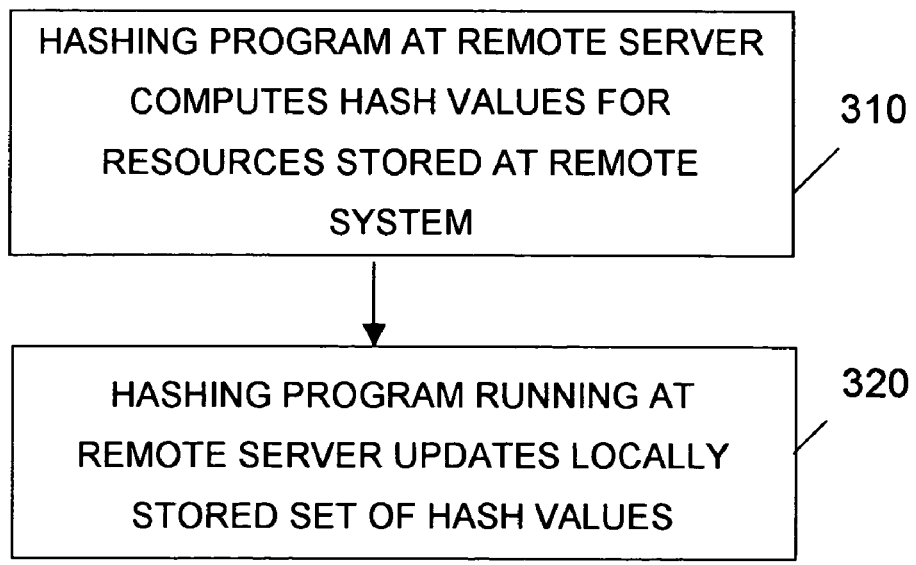
FIG. 4 shows set-up steps performed at a remote data processing system, according to an embodiment of the invention.

FIG. 4 shows set-up steps performed at a number of remote systems 70, such as Web server systems storing resources likely to be required by users of client data processing systems. A hashing program 140 running on a remote system 70 computes 310 a set of hash values 150 for a set of resources 160 stored at the remote system. Hash values may be computed for a large number of requestable resources (such as all audio or video files available from a Web server) or for a small subset of stored resources such as a set of especially large resources (such as BLOBs) which the remote system administrator identifies as likely to cause network congestion or heavy load on the remote server 70. For example, such resources may be upgraded versions of computer programs or service packs including program code for resolving vulnerability to viruses or other problems in existing programs.

The remote system administrator may determine the likelihood of a large number of users wishing to download a particular resource over a short period of time, either because users of the particular software typically access upgrades soon after availability or because the system administrator is aware of an enterprise-wide instruction to access this particular resource quickly.

In such cases, the remote system administrator may wish to avoid network congestion and load on the remote system. The system administrator configures the hashing program 140 running on the remote system to compute 310 hash values for a required set of resources 160 in response to each update to the set of resources 160. The hashing program 140 stores 320 the latest set of hash values 150 in association with the respective resources 160. The system administrator configures the remote system to respond to requests for resources 160 by sending the respective hash values for the requested resources to the requestor prior to sending the requested resources. A process associated with the hashing program 140 is able to intercept resource requests and to determine whether a requested resource is one of the resources 160 for which hash values are to be sent. This involves checking the local repository 150 and configuration settings. The process associated with the hashing program returns relevant hash values to the requestor.

Figure 5B:
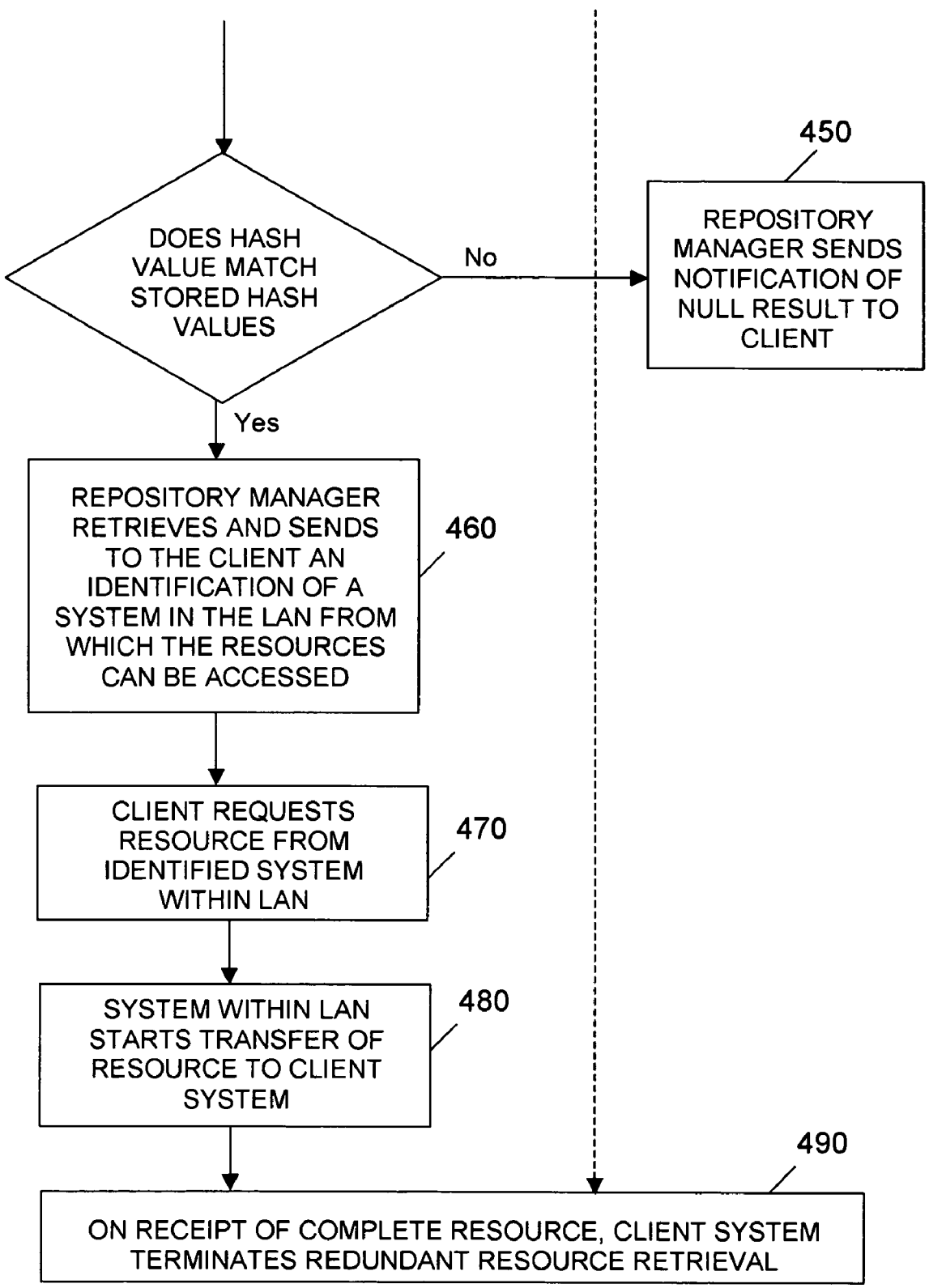
FIG. 5 is a flow diagram showing steps of a method according to an embodiment of the invention.

Described below with reference to FIG. 5 is a method for using the hash values stored in the repository 100 and hash values stored at remote systems 70, for controlling use of one or more bandwidth-sensitive connections according to an embodiment of the invention.

In a first example, a user-initiated operation on a client data processing system within a LAN requires access to a resource on a remote system. The user wants access to the content of a Web site—such as to download a video file or a computer program. The user interacts with a Web browser running on the client system using conventional techniques to request 400 a copy of the resource from the remote system. The requested resource is stored on the remote system together with a hash value derived 310 by applying the hash function to the bit pattern of the resource. When the request is received at the remote system, the hash value representing the requested resource is sent 410 to the requesting client system by the process of the hashing program 140, as described above. The remote system then starts 420 to transfer a copy of the requested resource to the requesting client system.

In the present embodiment, the requesting client system initiates processing of the received hash value in parallel with starting to download the requested resource from the remote system. In particular, the hash client 130 running on the requestor client system responds to receipt of the received hash value by forwarding 430 the received hash value to the pool server 30. The repository manager 110 on the pool server then compares 440 the received hash value with the set of hash values stored in the repository to determine whether any of the stored hash values match the newly received hash value. A matching hash value is recognised as an indication that a copy of the required resource is available from one of the systems in the LAN for which the pool server repository 100 holds hash values, because of the uniqueness property of secure hash values. If no match is identified, a notification of the null result is returned 450 to the requestor client system However, if a match is identified, the repository manager 110 running on the pool server retrieves 460 from the repository 100 the associated identifier of a system within the LAN (or identifiers of a number of systems) which holds a copy of the resource corresponding to the matched hash value. The repository manager 110 also retrieves an identifier of a specific directory or file location. The system identifier and directory or other location identifier is then sent 460 to the requestor client system. The client system receives this system and location information and sends 470 a request to the identified system for a copy of the required resource. The hash value for the resource may be included within the request as an identifier of the required resource, or conventional path and file names may be used. On receipt of the new resource request, the identified system within the LAN commences 480 a transfer of the requested resource to the requester client system.

In the present embodiment, the requestor client system can have two (or more) retrieval operations running in parallel for the same resource. The requester client system does not terminate either of the in-progress operations at this stage, despite the redundancy, but accepts whichever of the two copies of the resource is fully received first. If the resource is available within the LAN, access to this copy of the resource is typically possible via a relatively high bandwidth connection and so the copy of the resource stored within the LAN will typically be the first copy successfully received at the requester client. In this case, the use of hash values to identify and retrieve a copy of a desired resource from a system within the LAN may have significantly reduced the time required for the retrieval operation.

This embodiment of the invention can reduce network congestion, load on the remote system, and traffic over the bandwidth-sensitive connection (if the resource was retrieved locally before the majority of the resource was transferred from the remote system), but a significant advantage of the solution is the potential reduction in the time taken for resource retrieval. The larger the resource to be retrieved, and the more constrained the available bandwidth of the bandwidth-sensitive connection, the greater the benefit of retrieving the resource from within the LAN.

However, if the first copy of the resource to be retrieved is the copy stored at the remote system, the resource retrieval has been completed in approximately the same time as if the present invention had not been used and the requestor client had only requested one copy of the resource via the bandwidth-sensitive connection. Thus, the steps of attempting to identify and retrieve a copy of the resource from within the LAN have not significantly delayed retrieval of the resource (if at all) and have been performed with relatively low processing or communication overhead due to the small size of the transferred hash values.

Whichever copy of the resource is retrieved first, the requestor client terminates 490 any redundant in-progress retrieval operations in response to successful receipt of a copy of the resource. This minimises further resource-retrieval processing.

An alternative embodiment of the invention seeks to further reduce redundant use of the bandwidth-sensitive connection, and load on the remote server, by terminating retrieval of the resource from the remote system in response to a determination that the resource is accessible from within the LAN (i.e. before the resource is retrieved). In this case, the requestor client system responds to receipt from the pool server of the identification of a system within the LAN storing the resource, by both terminating the remote retrieval operation and requesting the resource from the identified system within the LAN.

A further alternative embodiment seeks to further optimise resource retrieval speed by building a resource from portions transferred from different sources, such as from a system within the LAN and a remote system. To implement this embodiment, the hash client running at each of the systems within the LAN is configured to send to the requestor client system an indication of the size of the resource (number of bits) and to control transfer of the bits of a resource in a reverse order relative to the bit transfer order of the resource during transfer from the remote system. This causes the system within the LAN to start by sending the size indication and the last bits of the resource, whereas the remote system starts by sending the first bits of the resource. When the total number of bits received from the two sources equals the indicated bit size of the resource, all of the bits of the resource have been received. The hash client then combines the received portions of the resource from the two different sources and terminates further data retrieval processing.

In a further embodiment of the invention, a required resource is only retrieved from a respective data processing system within the LAN after comparing the timestamp of the latest hash value computation for the hash values stored at the respective system and the timestamp of the last modification of the copy of the resource stored at the respective system. If the hash value timestamp is earlier in time than the resource update, the stored hash value is deemed unreliable as an identifier for the resource stored at the system within the LAN. In this case, a new hash value computation may be initiated for the relevant system within the LAN, or the attempt to retrieve the resource from the system within the LAN may be terminated.

For reasons of backward compatibility with older clients, a server may check the version of the connecting client and only transmit hash values to resource-requesting clients if their version number is greater than a particular value. This ensures that the hash values are only sent to clients which are capable of using the received hash value to attempt to improve efficiency of resource retrieval. Alternative embodiments involve the initial client request to the remote server specifically indicating a desire for receipt of a hash value for the requested resource.

A number of different application programs may be configured to connect to a repository manager 110 on their local system, to use the hash value comparisons of the repository manager to enable identification of local replicas of a resource and optimised data transfers. Such applications may include antiviral programs, instant messaging applications, groupware applications such as programs combining e-mail services with database management functions, Web servers, distributed software installation programs, application servers and other forms of application-enabling software ("middleware").

Transfer of Directory Structured Data

Described below is a mechanism for transferring directory-structured data between entities separated by a bandwidth-sensitive communication channel. The mechanism is especially useful when the receiving entity already possesses a portion of the data being transmitted, or the receiving entity has access to a portion of the data from an alternative source and can obtain the data from the alternative source more efficiently than via the bandwidth-sensitive connection.

A set of hashes are sent to an intended recipient to enable the user to determine which of the resources represented by these hashes he/she already possesses, and which can be obtained via a relatively high-bandwidth connection. A template is created which represents the directory structure and contains all of the hashes. This template comprises a data structure or a file (preferably in XML format), which represents the hierarchical directory structure including the locations of individual resources within the directory, and also contains the hash values corresponding to the resources of the directory.

The template is sufficient to reconstruct the entire hierarchical directory provided that the bit patterns of each of the resources can be made available from somewhere.

The typical pattern of exchange involves
1. The sender sends the template to the recipient.
2. The sender optionally sends some data he is sure that the recipient does not have or is unlikely to have.
3. The recipient saves the template as an incoming folder or file (saved in a designated directory and accessible as a normal read only directory or file) and attempts to obtain as much data as possible quickly from local sources (starting with a check of the storage of the local system and, if not available on the local system, obtaining data from one or more pool servers).
4. The recipient sends back a list of hashes for which it could not find the data via the pool servers and local storage.
5. The sender now sends across all the files (preferably compressed) that the recipient had asked for.

The specific details of these interactions are described below in more detail. Advantages achievable by specific implementations of the described mechanism include:
1. Redundancy of data across systems can be fully exploited.
2. The XML template is small in size, which facilitates quick transfer over mail and enables the template to be stored on low capacity storage medium such as a floppy disk. Sending an entire folder as an e-mail attachment may overload the user's mailbox or use an undesirable large amount of the available communication bandwidth.
3. Retransfer of a limited subset of data corresponding to a damaged floppy which forms a part of a spanned directory or archive is not costly.
4. Sharing of folders can be much more streamlined and secure than using conventional folder sharing approaches. Conventional sharing of folders exposes security (if not password protected) or puts constraints on operation convenience (if a UserID must be allocated and a Password sent to a user before they can log in), or both.

This solution is complementary to the above-described pool server architecture, where pool servers provide resources (bit patterns) corresponding to a given secure hash value. In case such a pool server is not present, an embodiment of the directory-structured-data transfer solution described herein can nevertheless attempt to make optimal use of the data available on the local machine. In the worst case, the transfer mechanism remains approximately as efficient as conventional applications.

In a first embodiment, the directory-structured data transfer solution comprises a program that produces a blueprint of a directory by traversing it recursively and determining the secure hashes of all the files present in that directory and its subdirectories. The blueprint generator program also notes the various attributes of the file and folders such as name, size, access permissions, timestamps, etc. The same process may be applied to a collection of folders or files.

In some implementations, such as cases in which the blueprint is transferred asynchronously or "offline" (that is, sender and recipient entities are not connected to the network at the same time), some files may be compressed and appended to the blueprint upon request of the sender. The appended files are files that the sender thinks are unlikely to be available at the recipient's end. This increases the probability of avoiding any extra communication back to the sender for transfer of locally unavailable files. In some embodiments, a copy of the resources referenced by hash values may only be retrieved at the recipient system when a need arises for those resources, or after the user of the recipient system gives approval for retrieval of resources (to prevent malicious dumping of code on a recipient's system).

Specific implementations vary according to particular applications. In some example applications, the blueprint is transferred to the recipient as described below.
  a. In the case of an Instant Messaging Application, the sender specifies the name of the recipient—which may be done through an interactive dialog or by dragging and dropping the folder(s)/file(s) on the name of the recipient or into the chat window. The recipient may be a group. In this example, the recipient is an instant message peer usually referred to as a Buddy.
  b. In the case of a folder-sharing environment, the sender specifies the name of the recipient. This may be done through an interactive dialog or by dragging and dropping the folder(s)/file(s) on the name of the recipient or group. The recipient is another computer in the Network Neighbourhood.
  c. In the case of an offline transfer mechanism, the sender specifies the folder which needs to be sent. This may be done through an interactive dialog. The blueprint is saved to a file which can then be mailed to the recipient.

The blueprint may be made available to a recipient in the following ways:
  a. In the case of an Instant Messaging Application, the blueprint is made accessible though a hyperlink in the chat window or as an icon, which the user may click to initiate the transfer of the complete data. An alternate method is presenting a dialog box to the recipient confirming his acceptance of received data. Yet another alternate mechanism is to commence the transfer as soon as the sender initiates it. The transfer then happens in the background and the recipient is only explicitly asked for approval at the end of the transfer. The recipient may be given a visual indication of the transfer and may discontinue the operation if he/she chooses to do so.
  b. In the case of folder sharing, the blueprint becomes visible on the recipient's system as a read only shared folder. Actual data transfer is initiated only when the recipient tries to access or copy data from such a folder.
  c. In the case of an offline (asynchronous) transfer mechanism resembling zip files, the recipient receives the blueprint though mail or secondary storage, or other such methods where the sender and recipient are not connected to each other for synchronous communication and may not be simultaneously connected to the network.

A computer program at the recipient end of the transfer link tries to locate the data corresponding to the hash on the recipients system (from a snapshot which would be periodically taken) and through the Pool Server. If the data is identified successfully, the data is copied to the appropriate directory. If the attempt to identify the data from the pool server fails, the data needs to be transmitted.

In the case of online applications such as Shared folders or Instant messaging, this information is transferred automatically and the missing files are obtained from the sender. In case of an offline method, the recipient creates a special file called the transfer request containing the hashes of files that could not be located, which would then be sent to the sender through mail or floppy disks. On receiving this, the sender compresses and appends the files corresponding to the hashes to the Transfer Request and sends the Transfer Request back over mail or via secondary storage. In case the sender is unable to send out all the required files in one transfer, he/she can choose to send required files in a number of steps. In this embodiment, at the end of each step, the sender is sent a fresh transfer request, which will contain the hashes of the remaining files to be sent.

In case of an offline transfer, where a pool-server is not available, the recipient may indicate to the blueprint-extracting program the locations on the local computer or network where the program can find the resources corresponding to each of the hashes with a high degree of probability. The recipient may even choose an entire scan of the local hard disk for getting the files, depending on how critical the situation is.

Once all files are available at the recipient's system, the directory-structured data can be extracted and copied to any location according to the recipient's wishes. The files may also optionally be opened with an appropriate application.

In case of a distributed software installer, the same principles apply. In this case, each release of any application shall have its own unique Blueprint. In case another version of the software is present on the system, all those files need not be retransmitted. Also, if the same application has been installed on any computer on its network, most of the files could be accessed from that system or from the pool server. After receiving the entire data, the installer shall be executed this analyses the system and performs certain set-up activities.

Some embodiments of the invention use the calculated hash values and comparison of hash values for multiple purposes. Firstly, hash value comparisons may be used to identify data files and executable files which have not changed since a previous virus scan classified them as virus-free, and therefore do not currently require a virus scan. Secondly, hash value comparisons can be used to identify replica resources within a LAN to enable avoidance of repeated performance of an operation for all of the replicas. For example, the result of a virus scan performed for one of the replicas can determine whether all replicas (files having matching hash values) are virus free or contaminated. An identification of unchanged files and replicas using hash value comparisons may also enable avoidance of repetitious backup operations. Yet another use of hash values is to enable automated restoring of system resources following a failure, by reference to stored hash values for resources of the failed system and comparison with stored hash values for other systems. Hash values that match the hash values of resources of a failed system identify replicas of the resources of the failed system, and the replicas can be used for recovery of the failed system.

Any one or more of the above-described uses of hash values can be performed independently of the other uses, but maximum return on the hash value processing may be achieved by using the hash values for multiple purposes. A number of the above-described uses of hash values and other extensions to the hash grid architecture are described below in more detail.

Hash-Based Hyperlinks

The current hyperlinks in Web pages contain Uniform Resource Locators (URLs) or other Uniform Resource Identifiers (URIs) that are used to identify resources accessible via the Internet. For example, a hyperlink including a URL is:

<img src='http://www.ibm.com/mydir/yourdir/logo.gif'>

Such URLs indicate how to access a resource, typically as a combination of:

a) The protocol to be used for communication, (for example, http or ftp);
b) The name of the Website (www.ibm.com) which is mapped to a server computer's IP address;
c) The directory on the server in which the file is located. (such as: /mydir/yourdir)
d) The filename (for example, logo.gif)

Such a mechanism for locating resources has some disadvantages. A first problem with such URLs is that whenever resources are moved the links are broken. Secondly, in case such files are stored on secondary storage, the corresponding files must be stored with a pointer to the original file locations or the html files need to be modified to reflect the new location. Thirdly, although exactly identical files may be accessible through different URLs, and proxy servers may have cached one of the files, the proxy servers are unable to identify matches and so are unable to utilise the information stored in their caches.

A hyperlinks mechanism is described below, which enables resources to be referenced using the secure hashes of the resources as a part of the hyperlink itself. The mechanism uses the hash grid infrastructure (including pool servers) as described above. The pool servers provide their resources to clients that request a resource, if the request includes the hash value of a resource stored at the pool server.

A hash-based resource reference or 'URI' (see comment below) for use according to the hyperlinks mechanism of the present embodiment may have the following notation:

<img src='sha1://poolserver.ibm.com/egufe2345gf35i345345efrbuer'>

In this example notation, which is for illustrative purposes only, 'sha1' indicates the hashing function used to create a hash value (to avoid trying to compare hash values computed using SHA1 with other hash values computed using MD5, for example), 'poolserver.ibm.com' identifies a specific server computer of a LAN or network segment at which the resource is located, and 'egufe2345gf35i345345efrbuer' is the secure hash value of the desired resource.

The hash-based resource references included in a hyperlink according to this embodiment of the present invention are referred to as 'URIs' herein for ease of reference. However, specific implementations of the hash-based resource references may not conform to the specific syntax description of a URI within the IETF Network Working Group's Request for Comments 1630 "Universal Resource Identifiers in WWW—A Unifying Syntax for the Expression of Names and Addresses of Objects on the Network as used in the World-Wide Web", T. Berners-Lee, 1994, or RFC 2396 "Uniform Resource Identifiers (URI): Generic Syntax" T. Berners-Lee et al, 1998. The hash-based resource references may be implemented as extensions to known URI definitions or as alternatives that can be used in a manner complementary to known URIs.

Some example alternative hash-based hyperlink notations are as follows:

```
<img                    src='ftp://poolserver.ibm.com/
    hash?=sha1&20egufe2345gf35i345345efrbuer'>
<img            src='http://poolserver.ibm.com/
    hash?sha1=egufe2345gf35i345345efrbuer'>
```

In the above examples, a communication protocol is specified explicitly as well as the identification of the pool server and hashing function, and the hash value of the desired resource. Further alternative notations may be used, such as for implementing document links according to the format requirements of proprietary programs which do not implement W3C Internet standards.

A hash-based hyperlink, such as in the above examples, identifies a specific pool server. When a user interacts with a hyperlink in a Web Browser implementation, their Web Browser generates a request including the URI that is sent to the pool server. The pool server receives the request and identifies the hashing function identifier and the hash value. The pool server then compares the received hash value with its repository of hash values (limiting this comparison to stored hash values that were calculated using the identified hashing function). If a matching hash value is identified, the pool server returns a copy of the requested resource to the Web Browser of the requestor's system.

A hash-based resource reference could be implemented to enable a resource to be identified without the requestor specifying a particular path and file name within the targeted pool server, such that resources can be moved and renamed within the pool server without breaking hyperlinks. Matching resources stored under different file names or at different locations would not be identified by a normal Web server or proxy server in response to a conventional URL.

However, the hash based URI has a disadvantage in that such a URI consistently refers to the same data (since the hash value is not merely a convenient identifier but is an invariant property of the resource itself). In certain cases, a Web site provider may prefer to show the latest version of the data available at the Web page identified by the URL. For example, a user looking at stock prices will require the current version. In contrast, a user looking for a specific published version of a technical specification may require the original document but have no interest in reading the publisher's latest comments regarding progress on their subsequent draft specification. A hash-based URI may be suitable for the latter example but not the former.

The mechanism described below takes advantage of the different characteristics of the different elements within a Website and enables the author of a document to control the usage of static (hash-based) and dynamic URLs. For example, an image tag in HTML can be improvised to incorporate features and therefore benefits of both types of URI.

A hyperlink according to the present embodiment includes multiple resource-references, at least one of which references or URIs includes a hash-based resource reference. The hash-based reference includes a secure hash value representing the bit pattern of the desired resource. Such a multiple-reference hyperlink is referred to herein as a 'smart' hyperlink for ease of reference.

An example of a new type of multiple-URI ('smart') hyperlink is set out below:

```
<img src='http://www.ibm.com/mydir/dir/stock.gif'
    src0='sha1://poolserver.ibm.com/
        egufe2345gf35i345345efrbuer'
    src1='sha1://poolserver1.ibm.com/
        aswew1lk74h0inmlpoe23t9avbn'>
```

In the above example, the src attribute of the img tag is the conventional URL. This is to allow conventional Web browsers to display these pages without problems. The specific notation of the hash-based URIs in the above example is for illustrative purposes only and a number of alternatives may be implemented within the scope of the hash-based resource references aspect of the invention.

Each attribute of the img tag (src, src0, src1, etc) has a relative priority value. In the current example, let us assume that the src0 attribute has priority over the src attribute and the src attribute has priority over the src1 attribute. A multiple-URI hyperlink may additionally have src2, src3, etc.

A browser that incorporates the facility to exploit the smart hyperlinks tries to fetch the data using the URL with the highest priority. If the first attempt fails, the browser tries to fetch the resource using the URI with the next highest priority. The user may optionally be notified of each failure.

Advantages that are achievable using this smart hyperlinks embodiment include:
1. The probability of breaking all links is reduced since the links do not only depend on the physical location of the target resource.
2. The cache-hit ratio of the proxy servers is improved.
3. In case a target Web page has moved and is no longer available, it may still be possible to get a previous version of the data. This will be useful to some users and some types of resource.

The above advantages not only apply to HTML pages, but can also be incorporated into any type of document. The smart hyperlinks enable the target of the URL to be retrieved in the least response time from the optimal source.

In cases where the pool server contains most of the data being requested (and the pool server has a higher priority that the alternatively-referenced Web server or application server), the burden on the Web Server or Application Server is dramatically reduced.

Hash-based hyperlinks could also be used to refer to embedded objects that are considered to be part of a document.

In a case of static, hash-based URIs, different URIs addressed to the same pool server may refer to different resource bit patterns that have the same information or very similar data. In the case of dynamic URLs, different URLs refer to different sources that can provide the same or similar data.

Described below is a flow of events according to an embodiment of the invention:
1) A Smart Hyperlink consists of an ordered set of links of which at least one is based on hashes and the rest could be either conventional URLs, hash-based or both. The smart hyperlink contains the algorithm with which it was generated, the server from which the required resource can be obtained and the hash itself.
2) The Web Server provides a first document that contains the smart hyperlink to the Web Browser running on a requestor client system.
   a. The web server may convert normal hyperlinks in the documents into smart hyperlinks, after the document has been requested by the client and just before delivering it to the client.
   b. Alternatively a preprocessor may scan the document for hyperlinks, determine the secure hashes of the targets and modify the hyperlinks in the original document into smart hyperlinks.
3) On receiving a document containing such secure hashes, a conventional program that views the data ignores the hash based URIs. A client program enhanced to view documents that contain such smart hyperlinks presents the URIs to the hash client one at a time in the order of src0, src, src1 and so on. The client program requests the data using each of the URIs in turn. Requests are generated in turn for each URI in priority order until a request succeeds for some URI.

4) The hash client searches in its local cache to determine whether the hash value can be found. If it is found, the hash client provides the data to the browser. If the hash value is not available in the local cache, the hash client sends the hash value to the pool server identified in the specific URI. The pool server searches its repository of hash values to try to locate the data. If the search within the pool server's repository does not identify a matching hash value, a notification is sent to the hash client that the data is not found. The hash client sends a corresponding notification to the Web browser, and the Web browser then tries to obtain the document from an alternative source—such as by using a conventional URL request to a Web server if this URL request has the next highest priority after the failed hash-based URI.

5) Meanwhile, if the local pool server has spare processing cycles, the local pool server may also try to obtain the required data from a remote pool server identified in an additional hash-based URI. If the local pool server can connect to the remote pool server and retrieve the data, the local pool server will store the data in its own repository and send the data to the hash client that requested the data.

6) If the local pool server cannot connect to the remote pool server, then the local pool server notifies the hash client of this connectivity problem. The hash client also notifies the browser. The browser can then try to establish a connection to the remote pool server itself, using the appropriate URI.

7) If the browser fails to obtain the required data even from the hash-based reference to the remote pool server, the next URI in priority order (src1) is presented to the hash client. The hash client will follow the same process as given above, and this cycle continues until either the browser succeeds or all available URIs are exhausted.

8) The browser may optionally report failures to the end user. The user also has the option of configuring the processing of hyperlink URIs to specify a number of iterations (for example, src0 and src1 only) that the browser should execute in an attempt to obtain required data.

9) On receiving the required data, the Browser terminates further scanning of the smart hyperlink, and processes the received data. Such processing may include displaying the data to the user.

According to such an embodiment, data retrieval performance may be improved for the following reasons:

1) The first time a user accesses a particular static (hash) URL on the Internet, the pool server stores the data onto its cache. The next time a user accesses the same static (hash) URL, the request is satisfied by the pool server itself. Since the pool server is in the same LAN, the time taken to transfer the required data to users other than the first user is significantly reduced.

2) The web server is relieved of serving the complete data for each request.

3) Unlike conventional solutions in which each application has its own cache, the present embodiment provides a unified cache across applications. For example, a Netscape Navigator Web Browser has a cache and Microsoft Corporation's Internet Explorer Web Browser has a separate cache. The present embodiment, in which caching is done by the repository manager using secure hashes which uniquely and comprehensively identify the data, avoids unnecessary increases in cache redundancy.

The user experience may also be improved because, even if the latest data is not available or Web resources have moved, the user may be able to obtain at least a previous version of the data.

Furthermore, the document or html author is relieved of the burden of having to store the files in a particular directory structure.

Described above is an embodiment of the invention including a multiple-resource-reference hyperlink, in which one or more URIs may be hash-based. A hash-based URI has the limitation that any insertion of a new link changes the file and hence changes the hash value of the file that includes the link. However, inserting a hash-based link requires prior knowledge of the hash value. Described below is a modification of the mechanism for using multiple-resource-reference links, which aims to mitigate the problem of known solutions being unable to create documents having cyclic references. The embodiment described above supports hierarchical links, but not cyclic references (such as where a document X links to itself, or document X links to document Y which then links to X, etc).

To resolve the problem described in the previous paragraph, a mechanism is provided for parsing a hyperlink containing hash-based URIs and removing the hash-based URIs. The remainder of the hyperlink (i.e. the non-hash-based components) remains within the document. A hash value is computed for the document after removal of the hash-based hyperlinks. This provides an opportunity to modify hash-based hyperlinks without changing the document's hash value, and to incorporate cyclic references between documents. URIs which point to resources such as images, for example, that cannot link any further need not be removed from a document before computing its hash value.

As mentioned above, hash-based hyperlinks according to the invention may be implemented in a number of different computer programs, and are not necessarily limited to programs implementing W3C standards. For example, such hyperlinks may be used for embedding or linking images or other types of objects into word processing documents. Other applications include proprietary help file formats, 'Groupware', instant messaging applications. Additional example applications are described below.

Databases

In one embodiment, A database management system such as a Relational DataBase Management System (RDBMS) supports a special data type which stores the hash value representing an actual data object such as a Binary Large object (BLOB) or a Character large Object (CLOB) within the database. The actual data of the object may be stored inside or outside the database and is identifiable using the hash value. Typically, such databases may be accessed across low bandwidth channels and may be accessed on client systems by database drivers (such as, for example, Java Data Base Connectivity (JDBC) driver, Open Data Base Connectivity (ODBC) driver, etc). Data is usually returned to calling applications as result sets that are tabular results of queries. Such tabular results may now contain just the hash values of the corresponding Large Objects. The client application may then open the corresponding data in an optimised way using the hash grid, specifying the respective hash value of the data object using a special function. Such a technique may be adopted even in non-relational databases. XML data representing an hierarchical data organisation may be used together with the hash values for individual data objects and files located at the 'leaf nodes' of a 'tree' (i.e. end nodes of a branch of an hierarchy, furthest from the root node). The hash values may further represent another sub-tree, and so on recursively.

Operating System, Sytem Calls

In one embodiment, the hash based data access is made an integral part of an operating system. Typically, operating systems provide the functionality to open a file using a system of function call such as OpenFile( ). The file name is a parameter of the call. Similarly, an operating system may provide an OpenHash( ) standard system call, which accepts a hash as an input parameter and then obtains the corresponding data from the hash grid if possible, in the most efficient manner available, and makes the retrieved data available as an input stream for applications.

Printing Hash Values onto Physical Objects

Secure hash values may be used as unique identifiers of data that is associated with a physical object. The hash value derived from a data entity such as a manual, device driver, sample program code or a diagram may be printed onto a physical object. The hash value can then be read back from the physical object and used when wishing to access the data entity. For example, a hash value may be printed using a barcode representation together with a human-readable form of the hash value. Such a solution may be used to print onto a diskette or packaging of a computer program product an identification of associated programs or other associated information. An identification of a device driver may be printed onto a hardware device. Such a solution may also be used to obtain information about machinery in an industrial environment, or items on the shelves of a supermarket.

The use of secure hash values which are an invariant property of the data itself has advantages of not being application-specific and avoiding the need for participants to reach agreement on which information should be included. Hash values are also relatively small (typically fixed length) but th data they represent may be anything from a few bytes to terabytes. The location of the data may be transparent, with pool servers able to move data and manage their repositories (including merging and splitting pools). A hash value may refer to data which contains a conventional URL, providing assured identification of desired data combined with the benefits of conventional Website addressing. By printing the hash value on a physical object, a hand-held PDA may be used to swipe the printed hash value and to initiate communication with a pool server to obtain the information represented by the hash value.

A specific embodiment implementing the printed hash value features of the invention includes interacting client and server devices.
1. The servers accept the data that needs to be made available in the manner previously described. All the data that needs to be associated with any physical object is treated as a part of a large virtual pool of files, which may be physically present on one or more servers.
2. The servers compute and store the secure hashes of the files, and the files are then identifiable through their secure hashes. Secure hashes are unique identifiers. The servers are accessible on a network such as the Internet or an intranet.
3. The hashes act as Universal Resource Identifiers for the corresponding data, and can be printed on the physical object in a human readable form and/or a machine readable form. The machine readable form may be a barcode or similar mechanism. The hash values may be computed using any secure hashing algorithm (i.e. a hashing function which has a very low probability of collisions). Known hashing algorithms such as SHA1 and others producing hashes that are 128 bits, 160 bits, etc are considered appropriate at the present time.
   a. A human-readable hash value may be represented by 128/5=26 and 160/5=32 characters respectively (each character may represent 5 bits).
   b. A machine readable hash value could be a barcode or similar data representation, or could comprise storage devices such as magnetic strips.
4. When wishing to associate digital information with an object or set of objects, patterns containing secure hash values may be printed on the objects as mentioned above, and the corresponding data can be published via pool servers referenced within the printed pattern.
5. The data pool may be distributed across a network or users may be provided with a storage device which stores all such data (accessible by providing the secure hashes).
6. A user seeking information associated with an object uses a client program that allows the user to
   a. Manually enter the hashes (by typing, with auto-completion and fault tolerance mechanisms if desired, or by selecting from a list of options).
   b. Automatically input the hash (using a barcode scanner or other electronic scanning mechanism such as magnetic strips, smart cards, RFID tags, etc).
7. The client program then transmits the hash value to the server to retrieve the data that corresponds to the hash value. The client displays or makes this data available to the user who requested the data, and may provide other metadata such as newer updates provided by the server. Such additional metadata may be provided as xml files containing an arbitrary amount of information about the object, or as zip files that contain files and folders.
8. At the time of publishing to the server, the person publishing to the pool may be provided with a date or time until which the data will be available on the virtual pool. The server stores this expiry date and manages its data storage to provide availability up to that date. The server may or may not provide the data after that date. The server may have different expiry dates for online storage (hard disk or RAM) and offline storage (tapes and other secondary storage devices).
9. A data item identified by a hash value may comprise further static, hash based URIs and dynamic URIs such as conventional URLs leading to further information.
10. The device that scans a printed pattern may be a hand-held device such as a pen-based device or a PDA. The scanner device may then connect to a computer system providing data access.

Hash-Based Antivirus

One embodiment of the invention uses a comparison of hash values computed from the bit patterns representing stored files to identify which files have changed since the last virus scan. This avoids full virus scanning of files that have not changed since the last virus scan. The 'uniqueness' property of secure hashes is used to determine whether a file has been modified in the period between the previous virus scan and the present virus scan. If the file has been modified, a hash value computed after the change will differ from a hash value computed before the change, and this difference determines that another virus scan is required. If the hash value matches, the file is assumed not to have changed, and so the previous virus scan result is relied on. In this way, secure hashes computed for each of a set of files are used to identify the files that have to be scanned in a virus scan.

Figure 6:
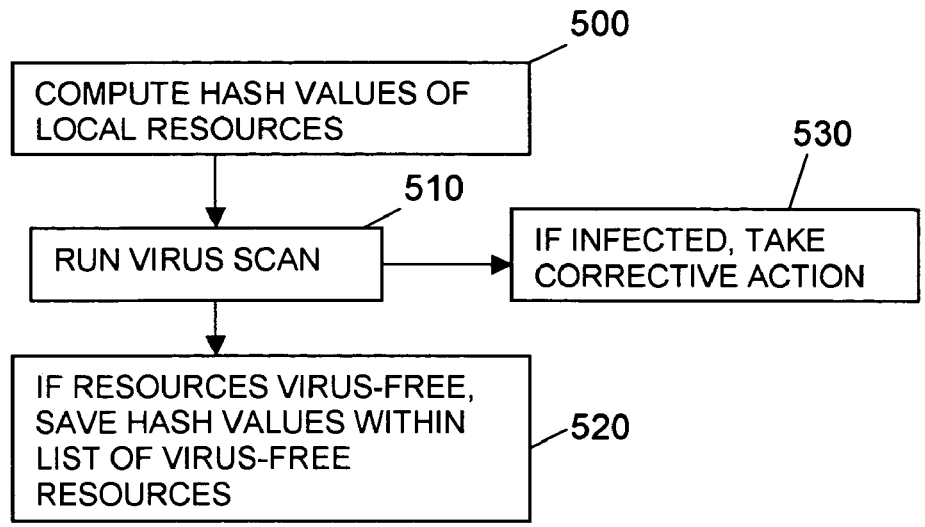
FIG. 6 is a schematic flow diagram showing steps of a method according to an embodiment of the invention.

Another technique enables a reduction of virus scanning of replica resources (for example, duplicates in backup storage, or multiple replicas distributed across a network). Matches between secure hashes are used to identify replica resources and the result of a virus scan of a resource is used in relation to one or more replicas of the resource A method according to one such hash-based antivirus embodiment is summarised in the flow diagrams of FIGS. 6 and 7. An initial execution 510 of an antivirus program running on a data processing system within a local area network may scan all of the local system's files for computer viruses, or may scan a subset of files specified by a user. The local antivirus program also invokes a message digest function (which may be an integral module of the antivirus program) to compute 500 hash values for resources of the system. A system's resources include the data files and executable files stored on the system.

If the resources are found to be virus-free, this fact is recorded 520 together with the computed hash values. Thus, a list of hash values is generated for resources classified as virus-free, and this list is stored on the local system. In one embodiment of the invention, the generated list of hash values for the virus-free resources of each system in a LAN is sent to a repository on a pool server. The pool server provides storage facilities for storing information relating to resources on all of the systems within the LAN, including the list of hash values for resources identified as virus-free and copies of selected resources of the different systems.

If infected resources are identified, action is taken 530 to isolate ("quarantine") the virus and actions may also be taken to decontaminate or remove the infected resource. The quarantining and decontamination steps may use known virus-protection techniques at each system. Alternatively, decontamination steps may be performed at the pool server on behalf of a number of systems in the network and a copy of the decontaminated version of the resource may be sent to the other systems.

Figure 7:
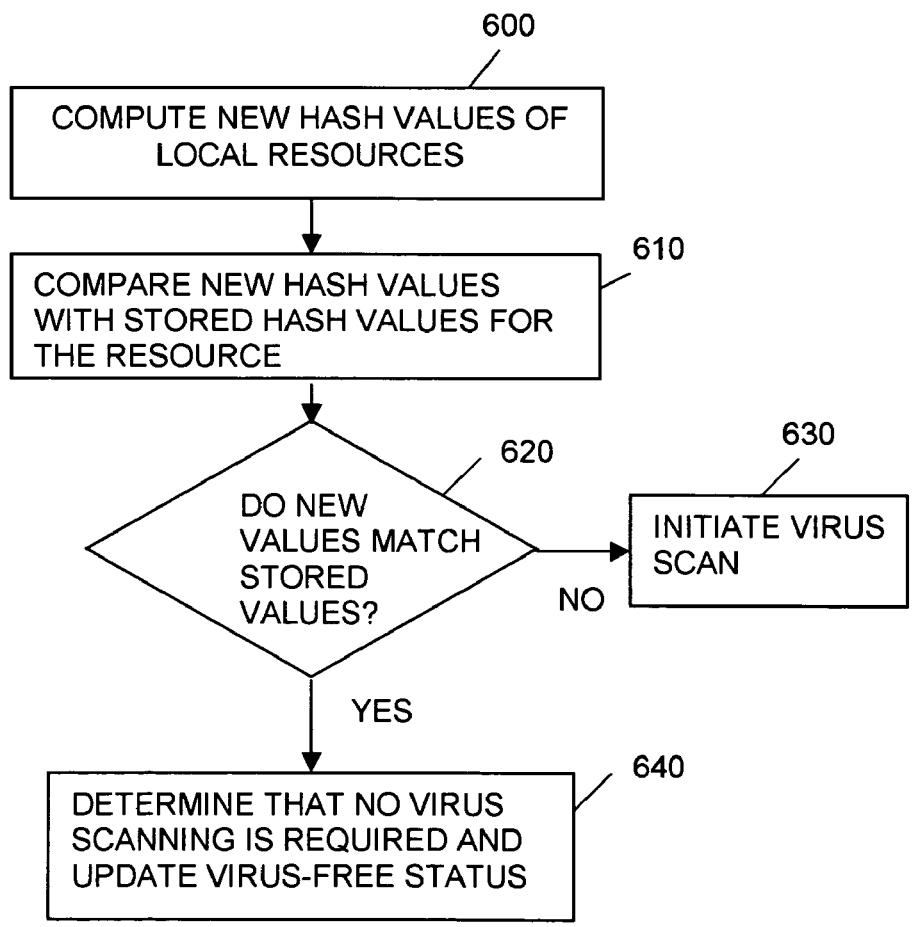
FIG. 7 is a flow diagram showing steps of a method according to an embodiment of the invention.

Subsequently, as shown in FIG. 7, new hash values are computed 600 when a virus check is required—either periodically or when triggered by user actions. The periodicity of scheduled virus checks is determined by settings of the anti-virus program running on the local system. The new computed hash values are compared 610 with the stored hash values and a determination is made 620 regarding whether the new hash values match the respective stored hash values. A match between respective new and stored hash values indicates that the respective resources have not changed since the last scan 510 determined that the resources were virus-free. Resources for which the stored and newly computed hash values match can be assumed to be virus-free—because virus contamination (or any other change) would have resulted in a different hash value being computed. Identification of a match between respective stored and new hash values leads to a determination 640 that no virus scanning is currently required for the relevant resource, and the virus-free status of the resource is updated by adding a new timestamp.

However, any difference between the stored and new hash values implies that earlier virus scan results cannot be relied upon. Therefore, a virus scan is initiated 630 for any new resource (any resource which did not exist when the last virus scan was carried out) and any other resource which does not have matching old and new hash values. If the virus scan finds that a new resource is virus-free, the new hash value is stored in a list of virus-free resources.

Hash-Based Avoidance of Repetitious Processing of Replicas

Another feature or embodiment of the invention uses a comparison of hash values to identify replicas of files to avoid repetitious virus scanning of multiple replicas (for example duplicate files in backup storage, or multiple replicas distributed across a network). Matches between secure hash values identify replica resources and then the result of a virus scan of a resource is used in relation to the identified replicas. Identification of replicas using hash values comparisons may also be used to reduce repetition of operations other than virus scanning.

Figure 8:
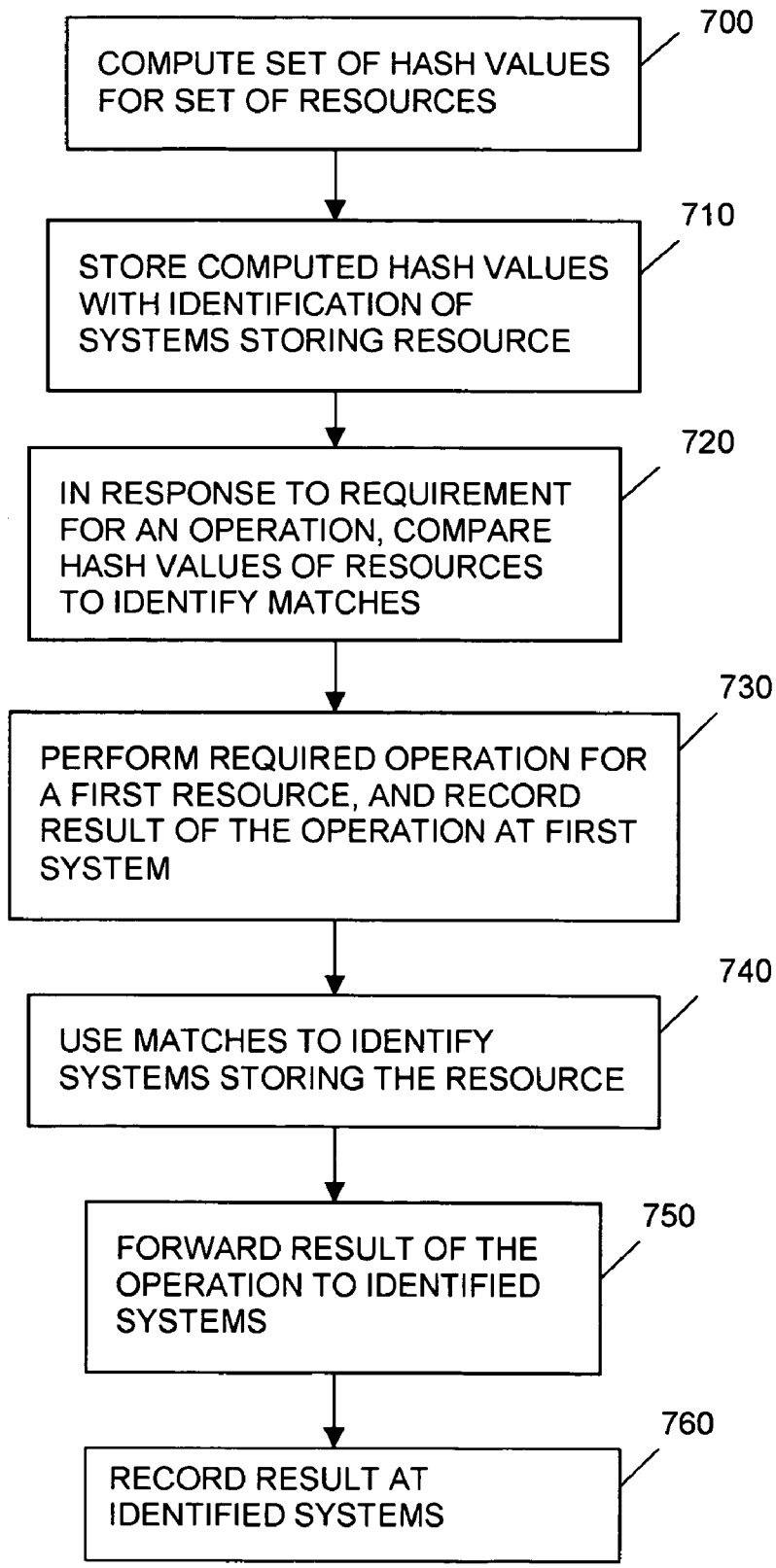
FIG. 8 is a flow diagram showing the steps of a method according to a further embodiment of the invention.

FIG. 8 shows a sequence of steps of a method for identifying replicas and avoiding repetitive performance of a specified operation for replicas of a resource. Periodically, or in response to a requirement for performance of a specified operation, systems within a LAN or network region (referred to hereafter as 'the LAN' for simplicity) compute 700 a set of hash values for resources stored on the respective systems. A secure hash function is applied to a bit pattern representing each resource for which a hash value is required. Each system then sends the computed hash values for locally stored resources to a pool server within the LAN. A coordinator program running on the pool server controls a repository manager to update 710 a repository of hash values representing a set of resources distributed across a plurality of systems within the LAN. The repository holds the hash value for each resource and an identification of the system on which the resource is stored.

A specified operation may be invoked by a user request or by expiry of a timer controlling periodic performance of the operation. The operation may be a virus scan performed at an end-user system within the LAN, or performed at the pool server. The operation may be a backup copy operation, or a combination of backup and virus check using a single read of a resource from secondary storage. When the specified operation is invoked at one of the systems within the LAN, a check is performed 720 of the hash values stored at the pool server. The check identifies replicas of resources within an individual system or distributed across the plurality of systems in the LAN, by identifying matches between hash values stored for different resource instances. A match between two hash values derived from applying a secure hash function to each resource's bit pattern demonstrates that the resource instances are identical replicas, since secure hash values are unique representations of the resource instance. The coordinator program retrieves 740 from the repository an identification of the systems within the LAN which hold replicas of a resource. When the specified operation is performed 730 in relation to a resource, a result of performing the operation is recorded at the system that performed the operation. The result is also sent 750 to each of the identified systems holding replicas of the resource. The result of the operation is then stored 760 at the identified systems. Such a method enables records to be updated at a plurality of systems within a LAN in response to performing the operation once in relation to one of the replicas of the resource within the LAN, and relying on matching hash values to identify replicas of the resource for which the same result can be recorded without repetition of the operation.

Virtual Backup and Recovery

As described above, a pool server provides a repository for secure hash values representing the set of resources stored at each data processing system within a LAN or other group of systems. This enables replicas of resources stored on a second data processing system to be used for recovery of resources of a failed data processing system. A failed system in this context may include a data processing system having a failed disk drive or other storage unit, or a system for which network connectivity is not currently available. Recovery of a failed system may involve rebuilding of lost data from replica data on one or more other systems. Alternatively or additionally, 'recovery' may involve one or more other systems serving requests for access to resources or providing other services as a replacement of the failed system. Even resources in active use on another system may be useable for recovery of a failed system.

This recovery of the data or services of a failed system by reliance on replica data and functions available from other systems is possible to the extent that the resources of a failed system are replicated elsewhere in the LAN or wider network. The repository of hash values at the pool server can be used to identify where replicas are stored, and this enables replicated resources distributed across the network to form a "virtual backup" of the resources of each system. This first embodiment of the recovery aspect of the present invention relies on a single pool server's repository of hash values to identify resource replicas within a LAN, to enable recovery of resources of a failed system from other systems within the LAN.

However, a network of interconnected pool servers may be provided and each pool server may store hash values representing resources distributed across a particular LAN or network segment.

A hash value of a required resource may be propagated through a network of pool servers and compared with stored hash values at each receiving pool server in turn until a matching hash value is identified. The matching hash value indicates that a specific one of the systems within the network segment represented by the current pool server holds a copy of the required resource. The network address of the specific resource-holding system is then returned to the original requestor, enabling the original requestor to set up a connection to retrieve a copy of the required resource.

The pool server which is local to the system holding a required resource could itself request a copy of the resource, for forwarding on to the original requester. This is within the scope of the recovery aspect of the present invention. However, in the present embodiment, a matching resource is not sent from a remote pool server to the original requestor as soon as the resource is discovered. This is because of the possibility of multiple different replicas of a resource being sent in parallel to the original requestor from different pool servers. Instead, the present embodiment sends an identification of the resource-holding system to the original requestor and leaves the requestor to initiate downloading or to request specific services of the required resource.

The collection of pool servers which are each responsible for storing hash values for a specific LAN or network segment, to enable optimized data transfer or recovery, may be referred to as a hash grid. Pool servers forming a hash grid may be deployed incrementally, starting from a single pool server for a single LAN and adding pool servers and connectivity between pool servers to provide virtual backup services for a wide area network.

Embodiments of the invention described in detail above include embodiments in which the pool server repositories include hash values and system identifiers, as well as embodiments in which the repositories also include copies of a subset of the resources of each system. A particular implementation of the latter is described below, in which the hash grid architecture is used to dynamically control levels of redundancy within a network.

As described previously, the repository manager 110 of a pool server is able to compare hash values to identify replicas of a resource within a LAN or other network segment. The repository manager may include a redundancy controller function which counts the number of systems within the LAN holding replicas of certain files or other resources comprising binary data, and then compares this number with a threshold number set by the LAN administrator. For example, redundancy exists if two systems hold a copy of a resource, and double redundancy exists if 3 systems hold a copy of the resource. If double redundancy is required for a resource type, the repository manager can be controlled to respond to a reduction in the number of replicas of a resource from 3 to 2 by saving a third replica to its own resource repository. If the number of replicas within the network increases in the future, the repository manager may determine that there is no longer a need for the pool server's repository to hold yet another replica and then the pool server's resource replica is deleted. In this way, the total pool of resource replicas distributed across a network can provide virtual backup storage of resources and the virtual backup can be managed to retain a desired level of redundancy.

A further embodiment of the present invention supplements the virtual backup features described above with timestamp information to enable a fine-grained, time-sensitive recovery facility. That is, a 'snapshot' comprising calculation and storing of the set of hash values of the resources on a computer system may be taken periodically. A later snapshot can be taken and stored—optionally only storing the new hash values and pointers to hash values of the previous snapshot to the extent that they are unchanged. If a first hash value snapshot for a 20 GB hard disk is of the order of 2-3 MB, a weekly snapshot update comprising storing just the differences from the previous snapshot will typically be much smaller. This can make it possible to store hash value representations of a system's resources over a long period. Since each hash value represents a particular version of a particular resource, each hash value may be compared with other hash values representing versions of resources distributed within the network to attempt to retrieve a particular desired version of a resource.

For example, a computer user wishes to retrieve a copy of a particular version of a report they created in the first week of 2004, but the user has misplaced or deleted the copy that was held on their local computer system. The repository of timestamped hash values held at the local pool server can be used to identify the hash values of resources stored on their system at the relevant date, and then the hash values identified for that date can be compared with the hash values of available resources to find a match. The matching resources can then be investigated to identify the required report (for example, using standard keyword searching through the identified matching resources to identify one target file or a small subset of files). This may enable retrieval of a version of a file from the local system's own data storage or from another system within the same LAN. The time-specific retrieval relies on a copy of the required file having been retained somewhere in the network, but does not require the user to recall where the file was stored.

Mapping Hash Values within Deployed Hash Grid

Multiple different hashing algorithms may be used as the Unique Identifiers on different hash grids. A shorter hash may be sufficient to ensure non-collision for a smaller grid than would be acceptable for a larger grid. To enable interchangeability between hashes computed using different hashing algorithms, a pool server may optionally store a mapping between secure hashes computed using different algorithms.

For example, MD5 hashes are shorter than SHA1 hashes. Under many situations the collision-avoidance property of both functions may be acceptable for providing a 1:1 mapping between hashes and data. On a particular system, a hash-based antivirus program may use MD5 digests for virus checking. A Web server may find it necessary to use SHA1 for smart hyperlinks. If the Pool Server has a mapping of SHA1-MD5 and both of the two hash values are available in storage, either hash value can be retrieved by reference to this mapping without having to re-read a file from disk and re-compute a hash value. Knowing the SHA1 hash value, the MD5 digest may be obtained, and vice versa. The determination of this mapping can be performed during times of least system activity. The above description of determining and storing mappings does not imply that an SHA1 hash value can be directly computed from an MD5 hash value (or vice versa). Each hash value is computed from the original input file, but this can be performed as a one-time operation. Thereafter, the recorded mapping can be reused.

The above use of mappings is possible because a 1:1 relationship exists between MD(x) and x, and between SHA1(x) and x, and this establishes a 1:1 relationship between MD(x) and SHA1(x). Although two specific algorithms are referred to herein as examples, the use of mappings between hashing functions can be applied to any secure hashing algorithm that provides an acceptable level of collision resistance for particular applications.

Use of a shorter hash for routine operations such as an antivirus check or user initiated 'snapshots' of the change status of resources can significantly improve performance, whereas a longer hash value can be used as a Globally Unique Identifier for purposes such as smart hyperlinks or optimizing data transfer across low bandwidth channels.

As will be clear to persons skilled in the art, various additional modifications and additions may be made to the methods, apparatus and computer programs described herein as embodiments of the invention, within the scope of he present invention as set out in the claims.

What is claimed is:

1. A method for accessing resources within a data processing network, comprising the steps of:
    computing a set of hash values representing a set of resources stored in association with at least one data processing system within the network;
    storing the computed set of hash values;
    in response to a requirement for access to a required first resource which is accessible via a bandwidth-sensitive connection, retrieving a hash value derived from the required first resource;
    comparing the retrieved hash value with the stored set of hash values to identify a match between he retrieved hash value and any of the stored set of hash values;
    in response to identifying a match for the retrieved hash value, initiating retrieval of the required first resource from said at least one data processing system and via said bandwidth-sensitive connection, including initiating retrieval of the required first resource via said bandwidth-sensitive connection in parallel with initiating retrieval of the required first resource from said at least one data processing system, wherein it is unknown at the time of the initiating whether bits of the required first resource will be delivered faster from the bandwidth-sensitive connection or from the at least one data processing system, and wherein the required first resource has bits arranged in a sequence, and the step of initiating retrieval of the required first resource from said at least one data processing system and via said bandwidth-sensitive connection comprises:
    initiating retrieval of all bits of said required first resource from said at least one data processing system and initiating retrieval of all bits of said required first resource via, said bandwidth-sensitive connection, wherein the retrieval of bits of said required first resource from said at least one data processing system is in a reverse bit sequence order relative to the retrieval of bits of said required first resource via the bandwidth-sensitive connection; and wherein the method includes:
    combining portions of the bit sequence of said required first resource received via the bandwidth-sensitive connection and received from said at least one data processing system to build the bit sequence of said required first resource; and
    presenting an indication of the retrieval of the required first resource to a user, wherein the step of retrieving the hash value derived from the required first resource comprises:
    sending a resource access request to a server computer at the remote network; and
    receiving the hash value from the server computer, and wherein the instructions when executed by the computer, cause the computer to implement the method such that the method further comprises the steps of:
    retrieving information indicating size of the required first resource; and
    completing the combining responsive to a total number of bits retrieved reaching the indicated size of the required first resource, wherein the reaching of the indicated size indicates that all bits of the required first resource have been retrieved, and wherein respective sizes of the portions of the bit sequence from the bandwidth-sensitive connection and from said at least one data processing system are not determined prior to all bits of the required first resource being retrieved.

2. The method of claim 1, wherein the step of retrieving the hash value derived from the required first resource comprises:
    sending a resource access request to a server computer via the bandwidth-sensitive connection; and
    receiving the hash value from the server computer via the bandwidth-sensitive connection.

3. A method for accessing resources within a data processing network, comprising the steps of:
    computing a set of hash values representing a set of resources distributed across plurality of data processing systems within a local area network (LAN), the resources within said set of resources being accessible from respective ones of the plurality of data processing systems;
    storing the set of hash values together with an identification of a respective data processing system of said plurality of data processing systems storing the resource corresponding to each of the set of hash values;
    in response to a requirement for access to a required resource which is stored at a remote data processing system, retrieving from the remote data processing system a hash value derived from he required resource;
    comparing the retrieved hash value with the stored set of hash values to identify a match between the retrieved hash value and any of the stored set of hash values;
    in response to identifying a match for the retrieved hash value, initiating retrieval of the required resource from a respective one of the plurality of data processing system at which the resource corresponding to the matched hash value is stored and from said remote data processing system, including initiating retrieval of the required resource from the remote data processing system in parallel with initiating retrieval of the required resource from the one of the plurality of data processing systems at which the resource corresponding to the matched hash value is stored, wherein it is unknown at the time of the initiating whether bits of the required first resource will be delivered faster from the bandwidth-sensitive connection or from the at least one data processing system, and wherein the required resource has bits arranged in a sequence, and the step of initiating retrieval of the required resource from said at least one data processing system comprises:

initiating retrieval of the bit sequence of said required resource in a reverse order relative to the retrieval of said required resource via the bandwidth-sensitive connection; and wherein the method includes:

combining portions of the bit sequence of said required resource received via the bandwidth-sensitive connection and received from said at least one data processing system to build the bit sequence of said required resource; and presenting an indication of the retrieval of the required resource to a user, wherein the method further comprises:

retrieving information indicating size of the required resource for use in controlling the combining; and completing the combining responsive to a total number of bits retrieved reaching the indicated size of the required resource, wherein the reaching of the indicated size indicates that all bits of the required first resource have been retrieved, and wherein respective sizes of the portions of the bit sequence from the bandwidth-sensitive connection and from said at least one data processing system are not determined prior to all bits of the required first resource being retrieved.

4. The method of claim 3, wherein the set of hash values and identification of a respective data processing system are stored with information regarding the location within storage of the respective data processing system of the resource corresponding to the hash value.

* * * * *